Oct. 15, 1929.   A. KATZINGER   1,732,019
BAKING PAN
Filed Sept. 8, 1928

Witness
Wm. P. Kilroy

Inventor
Arthur Katzinger
By Charles S. Wilson
Atty.

Patented Oct. 15, 1929

1,732,019

UNITED STATES PATENT OFFICE

ARTHUR KATZINGER, OF GLENCOE, ILLINOIS, ASSIGNOR TO EDWARD KATZINGER COMPANY, OF CHICAGO, ILLINOIS, A CORPORATION OF ILLINOIS

BAKING PAN

Application filed September 8, 1928. Serial No. 304,636.

The present invention relates to baking pans generally and particularly to pie plates, and has for its object the provision of a handle for the pan which will permit the ready manipulation and handling of the pan.

Another object of the present invention is to so construct and mount the handle upon the pan that the handle of one pan will in no way interfere with any other pan which may be in the oven.

Figure 1:
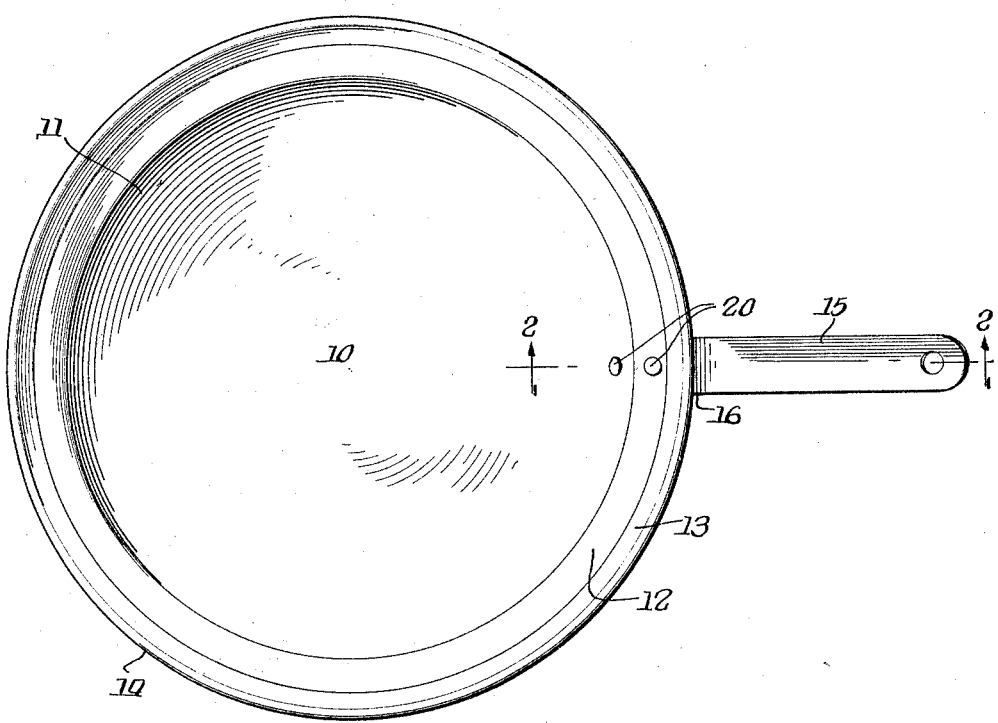
Figure 2:
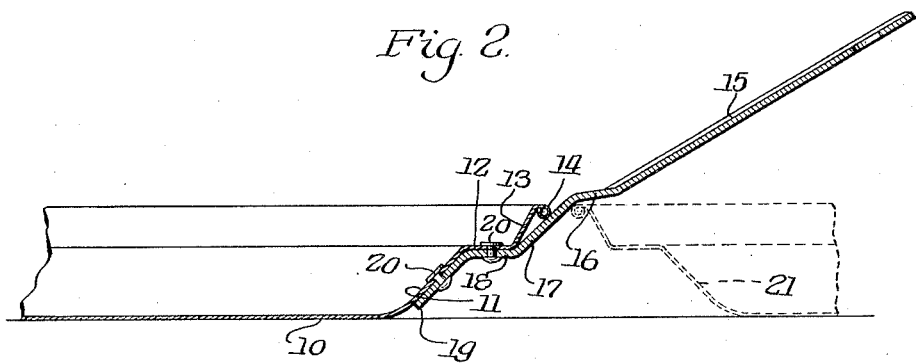

With the above and other objects in view, as will be apparent, this invention consists in the construction, combination and arrangement of parts, all as hereinafter more fully described, claimed and illustrated in the accompanying drawings, wherein:

Fig. 1 is a plan view of a pie plate illustrating the present invention in conjunction therewith; and Fig. 2 is a transverse section taken along line 2—2 of Fig. 1.

While the present invention is generally adapted to baking pans and is particularly designed for use in conjunction with pie plates, it is also designed and intended for use in conjunction with pie plates of the type which have a rim or lip projecting above the circumference of the pie top or crust to prevent the escape of juices. It is to be understood that while the invention is described in conjunction with a pie plate having this juice retaining lip or rim, it applies equally to pie plates and baking pans which are not provided with such rims or lips.

Reference being had more particularly to the drawings, 10 designates the circular bottom of a pie plate having a wall 11 sloping upwardly and outwardly therefrom. At its upper edge this wall 11 terminates in a substantially horizontal flange 12 which at its outer periphery or edge connects with an upwardly and outwardly extending lip 13. In practice the pie crust terminates at or upon the flange 12 and the lip 13 acts as a retainer for any juices which might otherwise escape from the pan. The lip 13 of the pan is generally provided with a bead 14 at its edge and upon the exterior thereof.

The handle 15 contemplated by the present invention comprises a relatively flat strip of sheet metal. At one end the strip of metal from which the handle or grip 15 is formed, rests flush, as at 19, against the wall 11 of the pan and at the upper end of this portion 19 the strip of metal is bent outwardly to form a relatively horizontal portion which rests under and flush against the exterior surface of the flange 12. The strip of metal is then bent upwardly and outwardly to form a section 17 which extends from the juncture zone between the flange 12 and the lip 13 tangentially with respect to the bead 14 to a point in a plane above said bead. At this point, located in a plane above the bead 14, the strip extends upwardly and outwardly as at 16 to merge with the gripping portion 15 of the handle which extends upwardly and outwardly from the terminal of the portion 16 of the handle 15.

Should the baking pan be of a standard construction, that is, should the lip 13 be eliminated and the bead 14 be located at the outer edge of the flange 12, the section 17 of the handle would be relatively short, extending from the end of the section 18 to a point somewhat above the bead 14.

The handle is secured to the plate illustrated in the drawing by rivets 20 which pierce the wall 11 and flange 12 and extend through the sections 18 and 19 of the handle. In the event the lip 13 is not present in the pan two rivets may pierce the wall 20 and section 19 of the handle or the rivets may be placed through the wall 11 and flange 12 provided the latter is of sufficient width. Of course, it is to be understood that any suitable equivalents of the rivets 20 may be employed.

It will be observed in consideration of Fig. 2 of the drawings, that the portions 15 and 16 of the handle are above the plane of the bead 14 so that in the event a second pan is located in the oven adjoining the first pan, the second pan 21 may extend under the section 16 of the handle while the gripping portion 15 of the handle projects upwardly and outwardly in a plane considerably above the plane of the top of said second pan. In this manner the provision of the handle does not in any way whatever interfere with the oven capacity or with the contents of any adjoining pans.

What is claimed is:

1. A baking pan including a wall, having a flange at its upper edge, a lip extending upwardly from the periphery thereof and a bead at the edge of said lip, in combination with a relatively flat handle comprising a section positioned flush against the wall, a second section located against the flange of the pan, an extension thereof extending tangentially beyond said bead, an intermediate portion projecting outwardly therefrom and a main gripping section extending outwardly from the end of said intermediate portion.

2. A baking pan including a wall, having a flange at its upper edge, a lip extending upwardly from the periphery thereof and a bead at the edge of said lip, in combination with a relatively flat handle comprising a section positioned flush against the wall, a second section located against the flange of the pan, an extension thereof extending tangentially beyond said bead, an intermediate portion projecting outwardly and upwardly therefrom, a gripping section extending upwardly and outwardly from the end of said intermediate portion, and rivets passing through the wall and flange and the corresponding portions of the handle.

3. A baking pan including an inclined wall, having a flange at its upper edge, an inclined lip extending upwardly from the periphery thereof and a bead at the edge of said lip, in combination with a handle secured thereto in a manner to avoid interference with an adjoining pan, consisting of a strip of metal having a portion of its length riveted to and following the contour of said inclined wall and flange, an adjacent portion of said strip of metal projecting upwardly and outwardly from the end of the preceding portion and extending tangentially with respect to said bead for a distance beyond said bead where said strip is again bent outwardly and upwardly, and a main gripping portion extending outwardly from the end of said last mentioned portion.

ARTHUR KATZINGER.